July 11, 1961 F. E. HARWOOD 2,991,710
TAG MAKING APPARATUS
Filed Jan. 10, 1958 2 Sheets-Sheet 1
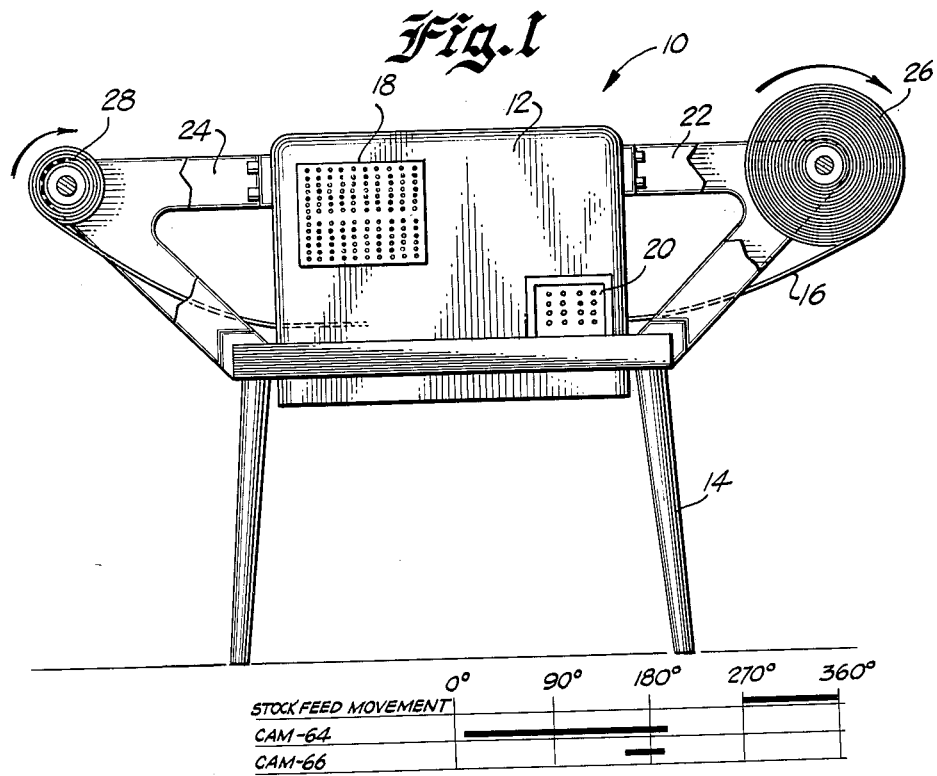
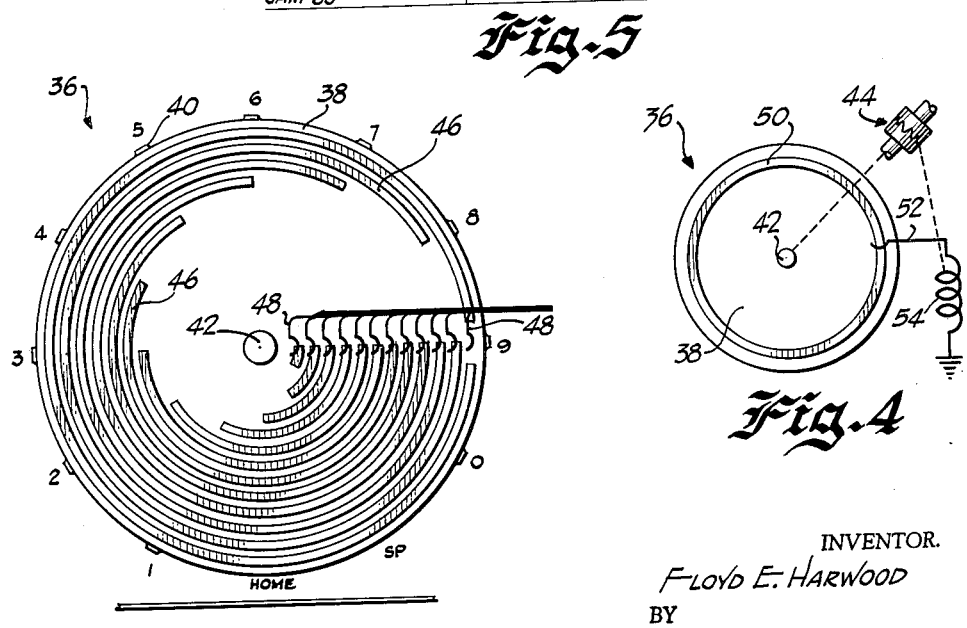
INVENTOR.
FLOYD E. HARWOOD
BY
Mason, Kolehmainen, Rathburn and Wyss.
ATTORNEYS.

United States Patent Office 2,991,710
Patented July 11, 1961

2,991,710
TAG MAKING APPARATUS
Floyd E. Harwood, Ypsilanti, Mich., assignor to Parsons Corporation, Traverse City, Mich., a corporation of Michigan
Filed Jan. 10, 1958, Ser. No. 708,199
6 Claims. (Cl. 101—93)

This invention relates to tag making apparatus and, more particularly, to automatic machinery for repeatedly recording fixed and variable items of data on successive portions of a blank record stock and for forming the successive portions into separable tags.

In order to reduce the time and cost of keeping business records in retail establishments, it has been proposed to provide merchandise price tags which contain sensible indicia representing various items of information pertaining to the merchandise. These items, which generally are stored on the tag in the form of fields of perforations, may include the cost and designation of the article, the department of the store, and other information of interest to the purchaser and the vendor. In many applications, much of the data on a group of tags is common to the entire group, such as the department of the store or the date on which the goods were received, and others of the items will be individual to each tag, e.g., the cost and identifying characteristics of the article, such as the style or designation thereof. Further, since much of the data on the punched tag must be readily intelligible to the customer, each tag preferably should include a printed or visible record of those portions of the perforated data which are of interest to the customer.

Thus, when an article is sold, the tag can be inserted in a suitable sensing unit to control tabulating equipment which is located either remotely or at the point of the sale and which automatically provides a record of the sale. The records provided thereby can include both a receipt for the customer indicating the cost of the article, the date of purchase thereof, and the designation of the particular item, for instance, and other records for use by the accounting and material control departments of the store. This reduces the time required to prepare the primary records which are necessary incident to each sale and also permits the maintenance of a complete control over inventory. Further, the punched tags provide a basic record that can be used with suitable portable tag sensing means to provide a system for quickly and automatically taking an inventory.

Accordingly, one object of the present invention is to provide new and improved means for making tags having data recorded thereon.

Another object is to provide an automatically operated tag making apparatus including means for recording fixed and variable sequences of data on blank stock and means for scoring the stock to form a succession of separable tags.

A further object is to provide tag making machinery including data storage means, a commutator, and a selectively effective manually controlled keyboard for making tags having data recorded thereon.

Another object is to provide a tag making apparatus including means for recording fixed and variable data sequences on a tag in both punched and printed form.

In accordance with these and many other objects of the present invention, an embodiment thereof comprises a recording unit including punching and printing components adjacent to which a continuous strip of tag stock is advanced by step-by-step feeding means. Certain fixed items of information, such as the date on which goods are received by the store or the department to which the goods are assigned for sale, and which are common to a plurality of tags are selectively stored in the tag making equipment by a previously wired program board. A manually controlled keyboard is provided for entering the variable items of information which are different for each of the different tags, such as the cost of the article and its identifying characteristics or designation. When a plurality of tags are to be made, one end of a roll of tag stock is inserted into the recording apparatus and the leading edge of the strip is automatically advanced to a position for receiving the items of information to be recorded on the first tag. The machine is now conditioned for continuous operation to record the necessary data on successive portions of the strip.

When the tag making apparatus is placed in operation, a commutator or switching means included therein initiates a cycle of operation during which the fixed items of information stored on the program board are successively applied to both a perforating mechanism and a printing mechanism comprising the recording means so that the fixed items of information are concurrently recorded on the record stock in printed and perforated form. Incident to each recording operation, the strip feeding means is operated to advance the record stock a single step. In order to provide variable items of information intermixed with the fixed items of information on each tag, when the commutator advances to certain settings, the automatic operation of the recording assembly is interrupted and the control over the recording assembly and the commutator is transferred to a manually controlled keyboard. The operator then enters the variable items of information and, following the completion of the recording of these items on the tag stock, restores the automatic control of the tag making apparatus. When the commutator or switching means completes a single cycle of operation, a solenoid is actuated which moves scoring dies into engagement with the record stock immediately following the last recorded item of information thereon so as to permit this portion of the stock to be separated from the remainder thereof, thus providing the first separable tag. This operation continues until such time as the operation of the tag making apparatus is manually interrupted or is automatically arrested in response to the depletion of the supply of blank stock.

Many other objects and advantages of the present invention will become apparent from the following detailed description of an embodiment thereof when considered in conjunction with the following drawings wherein:

FIG. 1 is a perspective view of a tag making machine embodying the present invention;

FIG. 3 is a schematic view of one side of a printing wheel included in the apparatus shown in FIG. 1;

FIG. 4 is a schematic view of a reverse side of the printing wheel shown in FIG. 3, and;

FIG. 5 is a timing diagram illustrating the relative periods of operation of some of the components shown in FIG. 2.

Figure 2:
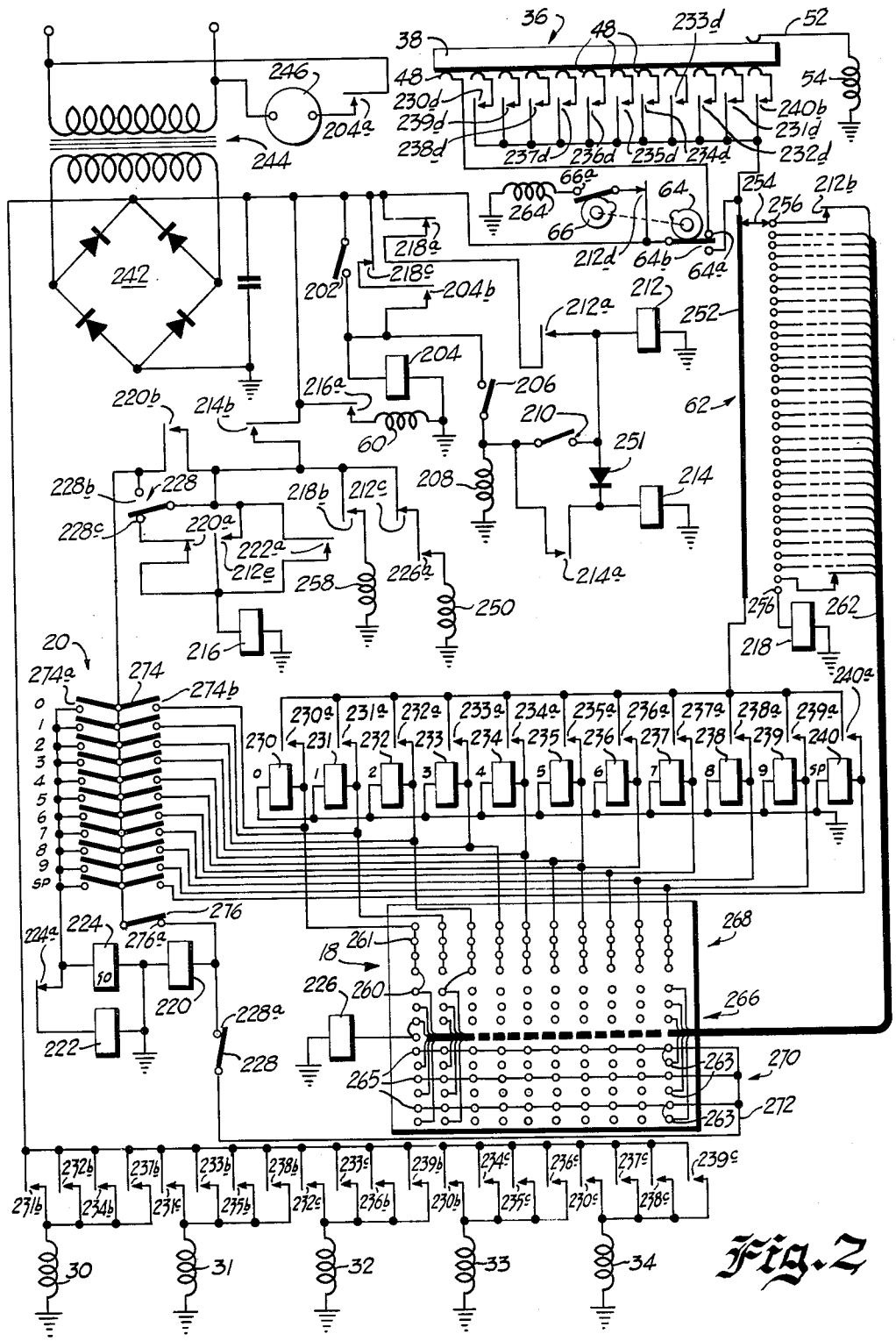
FIG. 2 is a control circuit included in the machine illustrated in FIG. 1 which provides means for recording fixed and variable sequences of data on each tag.

Referring now more specifically to FIG. 1 of the drawings, therein is disclosed a tag making apparatus 10 embodying the present invention. The apparatus 10 includes a housing 12 suitably mounted on a supporting frame 14 and in which are enclosed a recording assembly, a stock feeding assembly, a scoring die arrangement, and the control circuit shown in FIG. 2 which supplies fixed and variable data sequences for recording on a blank record stock 16. The control circuit also correlates step-by-step movement of the record stock 16 with the recording of the information and operates the scoring dies at the end of each cycle of recording operation to provide a separable tag. To provide means for storing fixed sequences of data, the apparatus 10 includes a program control board or plug panel 18. A manually controlled keyboard 20 is also provided to record items of data on the tags. A pair of reel supporting brackets 22 and 24 secured to the opposite ends of the housing 12 rotatably support a supply reel 26 of record stock 16 and a take-up reel 28. A step-by-step stock feeding mechanism provided in the apparatus 10 withdraws the blank stock 16 from the reel 26, feeds it through the apparatus 10 in synchronism with the operation of the recording assembly, and discharges it from the housing 12 to be received by the take-up reel 28. If desired, suitable drive means for the reel 28 can be provided.

Referring now more specifically to the recording assembly in the apparatus 10, this includes both a perforating assembly and a printing assembly for concurrently perforating and printing the fixed and variable items of information on the record stock 16. The perforating assembly preferably is of the type shown and described in detail in the copending application of Floyd E. Harwood and Rodney R. Mast, Serial No. 675,148, filed July 30, 1957, which copending application is assigned to the same assignee as the present application. As illustrated therein, the perforating or punching mechanism is adapted to selectively punch one or more apertures in ten positions spaced transversely of the record medium under the control of ten interposer solenoids. However, in the tag of the present invention, the necessary items of information can be perforated in a form of modified binary code by the provision of only five interposer solenoids 30, 31, 32, 33 and 34 (FIG. 2). Different combinations of two of the interposer solenoids 30—34 are selectively operated by the control circuit illustrated in FIG. 2 so that different combinations or permutations of two perforations are provided in the record stock 16 representing each item of digital information. The selective operation of two of the solenoids 30—34 selectively displaces two interposer elements so that, when the punching apparatus is actuated in synchronism with operation of the mechanism for feeding the stock 16, two punch elements corresponding to the operated interposer solenoids are rendered effective to perforate the stock 16 in accordance with the coded designation of the digit to be recorded.

In order to provide a visible or printed indication of the digits recorded in perforated form, the recording assembly in the tag making apparatus 10 includes a printing assembly indicated generally at 36 (FIGS. 2, 3 and 4). The printing assembly includes a dielectric wheel 38 having a plurality of raised characters 40 formed on the periphery thereof which can be inked to directly print on the stock 16 or can provide a printed representation on the stock 16 by the use of an inked medium, such as a ribbon. The wheel 38 is secured to a rotatable shaft 42 which is selectively driven through a clutch mechanism 44 so that the proper character 40 is moved into a printing position under the control of the circuit shown in FIG. 2.

To provide a means for adjusting the position of the wheel 38, one surface of this wheel is provided with twelve arcuately spaced conductive segments 46 which represent, in radially extending order, the digits "1"–"9," "0," space, and home. Twelve wipers 48 are provided, each of which cooperates with one of the conductive segments 46. The other face or side of the wheel 38 is provided with a continuous conductive segment 50 which is connected in common to all of the conductive segments 46. The segment 50 is engaged by a wiper 52 which is electrically connected to the winding of a solenoid 54.

When the position of the printing wheel 38 is to be adjusted, a positive potential is selectively supplied by the control circuit shown in FIG. 2 to one of the wipers 48. This positive potential is extended through the engaged segment 46, the common segment 50, and the wiper 52 to energize the solenoid 54. The energization of the solenoid 54 engages the clutch 44 so that the shaft 42 is rotated. This rotation of the shaft 42 and, consequently, of the wheel 38, moves one of the raised characters 40 to a printing position in which the selected character is aligned with the stock 16 and a shiftable platen. At this time and as determined by the one of a plurality of wipers 48 to which the positive potential has been applied, the energized wiper moves out of engagement with the conductive segment 46 and into engagement with the dielectric material of which the wheel 38 is formed, thereby interrupting the circuit for the solenoid 54. At this time the clutch 44 is disengaged to terminate the rotation of the shaft 42 with the proper character 40 in a printing position.

In order to return the printing wheel 38 to a normal position, the control circuit shown in FIG. 2 applies a positive potential to the outermost of the wipers 48 which engages the outermost conductive segment 46. This segment is continuous except for a short break at the home position of the wheel 38. Thus, when a positive potential is applied to the outermost wiper 48, a circuit is completed through the outermost segment 46 for again energizing the clutch solenoid 54 to drive the wheel 38. The clutch 44 remains engaged to drive the wheel 38 to its normal home position, at which time the outermost wiper 48 moves out of engagement with the outermost conductive segment 46 to interrupt the energizing circuit for the solenoid 54. This releases the solenoid 54 to terminate the drive for the wheel 38.

To advance the blank stock 16 relative to the recording means, the apparatus 10 includes an index feed assembly enclosed in the housing 12. This index or step feeding mechanism preferably is of the type disclosed and described in detail in the above identified copending Harwood and Mast application. As illustrated therein, the insertion of a record medium into a guideway therefor closes a switch so that a solenoid is actuated to shift an idler roller into engagement with the inserted end of the record medium and to bias the record medium into engagement with a drive roller. The drive roller is driven step-by-step through a Geneva movement including a one tooth pinion gear. The shaft to which the one tooth pinion gear is secured is controlled by a one revolution clutch mechanism which is rendered effective by the actuation of a solenoid, such as a solenoid 60 (FIG. 2). Thus, when the solenoid 60 is actuated, the shaft carrying the one tooth pinion gear rotates through a single cycle of revolution during which the drive wheel in the stock feeding mechanism is advanced through a short angular increment to advance the stock 16 a single step relative to the punching and printing apparatus. This single cycle of rotation of the control shaft actuated by the one revolution clutch also is effective through a gear train to advance a commutator or switching means indicated generally as 62 (FIG. 2), which commutator is identical to the commutator disclosed in the above identified Harwood and Mast application, a single step thereby synchronizing movement of the commutator 62 with movement of the record stock 16. Similarly, this control shaft controls cyclic rotation of a pair of cams 64 and 66 (FIG. 2) so that a plurality of contacts 64a and 64b and 66a are opened and closed in a timed relation to the movement of the stock 16 and the advancement of the commutator 62. The timed relation of the operation of the stock feeding mechanism and the operation of the contacts controlled by the cams 64 and 66 is illustrated in the timing diagram shown in FIG. 5. This figure illustrates the fact that the cams 64 and 66 are effective to actuate the contacts 64a, 64b and 66a in the beginning and middle portions of each cycle of rotation of the control shaft and that the index feed assembly is effective to advance the stock 16 a single step during the latter portion of each cycle of rotation of the control shaft.

Referring now to FIG. 2 of the drawings, therein is shown a control circuit for controlling the recording of fixed and variable items of information on the record stock 16 and for correlating the recording of this information with the operation of the scoring die mechanism and the operation of the feeding means for the stock 16. When the operation of the tag making apparatus 10 is to be initiated, the free end of the stock carried on the supply reel 26 is inserted into the housing 12 and into one end of a guideway therein and is advanced so that the leading edge of the stock engages and closes a switch 202. The closure of this switch extends a positive potential provided by a rectifier bridge 242 energized from an input transformer 244 to the operating winding of a relay 204, thereby operating this relay. The operation of the relay 204 closes a plurality of contacts 204a and 204b. The closure of the contacts 204b prepares a holding circuit for the relay 204 extending to the positive potential through a pair of normally closed contacts 218c. The closure of the contacts 204a connects a common drive motor 246 across the primary of the input transfomer 244, thereby placing the motor 246 in operation. This motor preferably provides a prime mover for driving the stock feeding mechanism, the punching assembly, the printing assembly 36, the commutator 62, and, if provided, a drive for the take-up reel 28. Thus, the energization of the motor 246 prepares the tag making machine 10 for operation.

The apparatus 10 is next conditioned for operation by closing a start switch 206. In a preferred embodiment of the apparatus 10, the switch 206 is mechanically linked to a shiftable support for the printing wheel 38 so that the wheel 38 can be shifted to a displaced position to facilitate the insertion of the stock 16. However, when the recording or tag making operation is to be initiated, the shiftable support for the wheel 38 is displaced to move the periphery of the wheel into juxtaposition to the stock 16, and this movement of the shifting support for the wheel 38 actuates the switch 206. The closure of the switch 206 extends the positive potential supplied through either the closed switch 202 or the closed contacts 204b to complete an obvious operating circuit for a solenoid 208. The energization of the solenoid 208 shifts an idler roller into engagement with the leading edge of the stock 16 and biases the stock 16 against the drive wheel in the stock index feed assembly which is rendered effective, as indicated above, under the control of the clutch solenoid 60.

In order to advance the leading edge of the stock 16 to a printing position adjacent the perforating assembly and the printing assembly 36, a momentary start switch 210 is provided. The operation of this switch advances the commutator 62 through a single cycle of rotation and also actuates, in synchronism therewith, the stock feeding mechanism so that the leading edge of the stock 16 is advanced to a recording position. More specifically, the momentary closure of the switch 210 forwards the positive potential provided at the closed contacts 206 to the operating winding of a relay 212, thereby operating this relay to close a plurality of contacts 212a and 212e and to open both a group of contacts 212b and a plurality of contacts 212c and 212d. The closure of the contacts 212a completes a holding circuit for the relay 212 extending to the positive potential through the closed contacts 218a. The closure of the contacts 212e prepares an operating circuit for a relay 216. The opening of the group of contacts 212b disconnects the commutator 62 from the remainder of the control circuit to render it ineffective during this first cycle of operation during which the record stock 16 is advanced to a recording position. The opening of the contacts 212c interrupts an operating circuit for a solenoid 250 which controls a numbering device for counting the number of tags produced by the apparatus 10. The opening of the contacts 212d renders a platen shifting solenoid 264 ineffective.

The positive potential provided by closing the switch 210 is also forwarded through a blocking rectifier 251 to complete an obvious operating circuit for a relay 214. The operation of the relay 214 closes a plurality of contacts 214a and 214b. The closure of the contacts 214a completes a holding circuit for the relay 214 which is shunted around the switch 210. The closure of the contacts 214b extends the positive potential through a pair of normally closed contacts 228c on a switch 228 and a pair of normally closed contacts 220a or through the closed contacts 212e to complete the operating circuit for the relay 216. The operation of the relay 216 closes a pair of contacts 216a to complete an obvious operating circuit for the solenoid 60.

The operation of the solenoid 60 engages the drive mechanism for the index feed drive means so that the leading edge of the stock 16 is advanced to a position aligned with the recording assembly. During this cycle of operation, the rotation of the cam 66 periodically closes the contacts 66a. This performs no useful function inasmuch as the opening of the contacts 212d prevents the application of the positive potential to the contacts controlled by the cam 66. Similarly, the cam 64 is rotated through a complete cycle of rotation incident to each step of movement of the record stock 16. The rotation of the cam 64 alternately opens and closes the plurality of contacts 64a and 64b so as to apply positive potential to the homing control circuit for the printing wheel 38 and so as to apply the positive potential to a common conductive segment 252 in the commutator 62. This positive potential applied to the conductive segment 252 is forwarded through a wiper 254 forming a part of the commutator 62 which is advanced step-by-step in synchronism with each cycle of rotation of the cam 64. However, this positive potential produces no useful function inasmuch as the opening of the plurality of contacts 212b disconnects the contacts 256 from the remainder of the control circuit.

However, when the wiper 254 is moved into engagement with the contact 256 forming the last stepping position of the commuator 62 and when the cam 64 closes the contacts 64b the positive potential is forwarded to the operating winding of an end-of-tag relay 218, thereby operating this relay to open the contacts 218a and 218c and to close a pair of contacts 218b. The opening of the contacts 218a interrupts the holding circuit for the relay 212 so that this relay releases. The rectifier 251 prevents the positive potential applied to the winding of the relay 214 from maintaining the relay 212 in an operated condition. In releasing, the relay 212 opens the contacts 212a and 212e and closes the contacts 212b, 212c and 212d. The opening of the contacts 212a interrupts the above described holding circuit for the first cycle relay 212 so that this relay is not again operated until such time as the leading edge of a new strip of stock 16 is inserted into the tag making apparatus 10. The closure of the contacts 212c prepares an operating path for the solenoid 250, and the closure of the contacts 212d forwards the positive potential to the contacts 66a controlled by the cam 66. The closure of the plurality of contacts 212b again connects the commutator 62 with the remainder of the control circuit to condition this circuit for controlling the recording of items of information on the stock 16. The opening of the contacts 212e does not release the relay 216 if the unit 10 has been conditioned for automatic operation by operating a switch 228 to close the contacts 228c. However, if these latter contacts are open, the relay 216 is released by the opening of the contacts 212e.

The closure of the contacts 218b completes an obvious operating circuit for a die controlling solenoid 258 so that the leading edge of the record stock 16 is scored by the scoring die, thereby to provide the forward edge of the first tag to be produced by the apparatus 10. These scoring dies transversely perforate the strip of stock material 16 in a conventional manner. The opening of the contacts 218c performs no useful function since the switch 202 remains closed.

During the continuing rotation of the cam 64, the contacts 64b are opened to release the relay 218 so that the contacts 218a and 218c are closed and the contacts 218b are opened. The opening of the contacts 218b releases the solenoid 258 to restore the scoring dies to a normal position. The closure of the contacts 218a and 218c serve no useful function at this time.

Assuming that the information to be recorded on the first tag comprises both fixed and variable items of information, the recording of this data on the stock 16 is initiated by the return of the wiper 254 to a position in engagement with the first contact 256. The movement of the wiper 254 of the commutator or switching means 62 to this first position marks the beginning of a cycle of operation of this switching means which is terminated when the last contact or switching position is reached. With the wiper in this first position, a connection is extended from the open contacts 64b through the common conductive segment 252, the wiper 254, the first contact 256, the closed contact 212b, a cable 262 to a receptacle or jack 260 in a first field 266 of jacks in the program control board 18 representing the first stepping position of the commutator 62. The jacks 260 in the field 266 are adapted to be selectively strapped to similar jacks 261 in a second field 268 in accordance with the values of the digits of fixed information which are to be recorded in the various stepping positions of the commutator 62. As shown in FIG. 2, the field 266 includes a plurality of jacks 260 each of which is individually connected to one of the contacts 256 in the commutator 62 through the cable 262. The field 268 includes eleven vertically extending rows of four electrically connected jacks 261 representing 0, 1–9, and space when considered from left to right as viewed in FIG. 2. Each of these rows is connected to the operating winding of one of a plurality of relays 230—240, which represent "0," "1–9" and space, respectively.

Thus, if the first items of information to be recorded on the tag in printed and perforated form in a fixed item of information and, for instance, is "0," the jack 260 representing the first stepping position of the commutator 62 is strapped, as shown in FIG. 2, to a receptacle 261 which is connected to the operating winding of the relay 230. Accordingly, the movement of the wiper 254 to the first stepping position conditions the control circuit for recording "0" as the first item of information on the first tag. The cam 64 opens the contacts 64a and closes the contacts 64b immediately following the time at which the wiper 254 is moved into engagement with the first contact 256. When the cam 64 is rotated to this position, the contacts 64b are closed to forward the positive potential over the above described circuit to operate the relay 230. The relay 230, in operating, closes a plurality of contacts 230a–230d. The closure of the contacts 230a completes a holding circuit for the relay 230 extending to the closed contacts 64b. To condition the perforating apparatus for recording a coded representation of "0," the closure of the contacts 230b and 230c completes obvious operating circuits for the interposer solenoids 33 and 34, thereby moving the interposer elements controlled by these solenoids into a position to block relative movement of the related punch elements.

In order to condition the printing assembly 36 for recording "0" on the stock 16, the closure of the contacts 230d forwards the positive potential from the closed contacts 64b to the wiper 48 which engages the conductive segment 46 representing "0." This positive potential is forwarded through the conductive segment 50 and the wiper 52 to energize the solenoid 54. The operation of the solenoid 54 engages the clutch 44 so that the printing wheel 38 is rotated until the character "0" is moved into a printing position adjacent the stock 16. At this time, the wiper 48 moves out of engagement with the conductive segment 46 to interrupt the operating circuit for the solenoid 54 so that this solenoid releases to disengage the clutch 44. Accordingly, at this time, the punching assembly is conditioned for operation by the actuation of the two interposer solenoids 33 and 34, and the printing assembly 36 is conditioned for operation by the movement of the printing wheel 38 into a proper position.

During the continuing rotation of the control shaft, the cam 66 moves to a position, as indicated in FIG. 5, in which the contacts 66a are closed. The closure of these contacts extends the positive potential through the closed contacts 212d and the contacts 66a to complete an obvious operating circuit for the solenoid 264. The operation of the solenoid 264 actuates a platen so that the stock 16 is moved into engagement with the raised character 40 representing "0" which is in printing position. Further, the continuing rotation of the control shaft reciprocates the support for the punch elements so that the two punch elements controlled by the interposer solenoids 33 and 34 are blocked against movement and perforate the stock 16 representing the character "0." Accordingly, a punched and printed representation of the first character of fixed information which is to appear on the stock 16 has now been recorded.

Continuing rotation of the control shaft next advances the cam 66 so that the contacts 66a are opened to release the platen actuating solenoid 64. Continuing rotation of this control shaft then advances the cam 64 so that the contacts 64b are opened and the contacts 64a are closed. The opening of the contacts 64b removes the energization from the common conductive segment 252 so that the operated relay 230 is released, thereby opening the contacts 230a—230d. The opening of the contacts 230a interrupts the holding circuit for the relay 230, and the opening of the contacts 230b and 230c releases the interposed solenoids 33 and 34. The opening of the contacts 230d serves no useful function at this time inasmuch as movement of the printing wheel 38 has previously been arrested, as described above. The closure of the contacts 64a forwards the positive potential to the outermost wiper 48 so that this potential is applied to the outermost conductive segment 46 to be forwarded through the common segment 50 and the wiper 52 to again energize the solenoid 54. The energization of the solenoid 54 engages the clutch 44 so that the print wheel 38 is restored to its normal home position, at which time the outermost wiper 48 moves out of engagement with its conductive segment 46. This disengages the clutch 44 to retain the printing wheel 38 in its normal home position.

During the continuing movement of the control shaft, the wiper 254 is advanced into engagement with the contact 256 forming the second stepping position and the stock feeding assembly is actuated to advance the stock 16 a single step. With the wiper 254 engaging the contact 256 in the second stepping position, a circuit is prepared extending to the receptacle or jack 260 in the field 266 representing the second stepping position. As illustrated, this jack is strapped to a receptacle 261 in the field 268 which is connected to the operating winding of the relay 232, thereby conditioning the apparatus 10 to record the digit "2" as the second item of information on the tag. Thus, when the cam 64 next closes the contacts 64b, the digit "2" is recorded on the stock 16 in printed and perforated form. This operation continues until such time as at least a portion of the fixed items of information have been recorded on the stock 16.

Assuming that it is desirable to record one or more variable items of information on the tag, the commutator 62, in advancing to the stepping position at which the variable items of information are to be recorded, prepares a circuit for disabling the automatic operation of the apparatus 10 and for placing this apparatus under the control of the manual keyboard 20. More specifically, assuming that the first digit of the variable information is to be recorded following the tenth stepping position of the commutator 62, when the wiper 254 moves into engagement with the contact 256 forming the tenth stepping position and the cam 64 is rotated to close the contacts 64b, the positive potential is forwarded over the cable 262 to a jack or receptacle 263 in a field 270 of receptacles in the program control board 18 representing the tenth stepping position.

The field 270 includes a plurality of receptacles 263 each of which is connected to one of the contacts 256 and a plurality of other receptacles 265, all of which are connected in common to a stop conductor 272. Thus, when automatic operation of the apparatus 10 is to be interrupted, one of the jacks 263, such as the one connected to the contact 256 forming the tenth position of the commutator 62, is strapped to one of the receptacles 265. When the contacts 64b are closed, the positive potential is forwarded over the conductor 272 to complete the operating circuit for a stop relay 220. The operation of the stop relay 220 opens the contacts 220a and closes a pair of contacts 220b. The closure of the contacts 220b forwards the positive potential provided at the closed contacts 214b through a pair of normally closed contacts 276a on a release key 276 and a pair of normally closed contacts 228a on the release switch 228 to complete a holding circuit for the relay 220.

The opening of the contacts 220a interrupts the above described operating circuit for the relay 216 so that this relay releases to open the contacts 216a. The opening of the contacts 216a releases the clutch solenoid 60 so that the one revolution clutch mechanism is disengaged. Thus, at the termination of the present cycle of rotation of the control shaft further movement of the shaft is arrested. During the completion of the present cycle of rotation, the wiper 254 in the commutator 62 is advanced into engagement with the contact 256 forming the eleventh stepping position, the stock 16 is advanced, and the cam 64 is advanced to close the contacts 64a and to open the contacts 64b. The opening of the contacts 64b interrupts the above described operating circuit for the stop relay 220, but this relay remains operated over the holding circuit completed at the closed contacts 220b. Thus, the control circuit shown in FIG. 2 is now conditioned for manual operation under the control of the keyboard assembly 20.

Assuming that the first variable item of information to be manually recorded is the digit "3," a switch 274 representing this digit is actuated to close a plurality of contacts 274a and 274b. The closure of the contacts 274b representing the digit "3" completes an obvious operating circuit extending through the closed contacts 220b for operating the relay 233 so that a plurality of contacts 233a—233d are closed. The closure of these contacts prepares a holding circuit for the relay 233, operates two interposer solenoids 31 and 32 to condition two punch elements for actuation, and conditions the printing wheel 38 for movement into a position in which the raised character 40 representing the digit "3" is in a printing position.

The closure of the contacts 274a concurrently completes the operating circuit for a pair of relays 222 and 224. The relay 224 is slow-to-operate and, accordingly, does not operate at this time. However, the positive potential provided at the closed contacts 274a is extended through a pair of normally closed contacts 224a to immediately operate the relay 222. In operating, the relay 222 closes a pair of contacts 222a to complete another operating circuit for the relay 216. In operating, the relay 216 closes the contacts 216a so that the clutch solenoid 60 is again operated. The operation of the clutch solenoid 60 initiates rotation of the control shaft so that the selected character "3" is recorded by the printing wheel 38 and is perforated in the stock 16, as described in detail above. In addition, the commutator 62 is advanced a single step.

After the slow-to-operate period of the relay 224, this relay operates to open the contacts 224a thereby interrupting the above described operating circuit for the relay 222. This relay releases to open the contacts 222a and thus interrupts the operating circuit for the relay 216 so that this relay releases to open the contacts 216a. The opening of the contacts 216a releases the clutch solenoid 60. However, the cycle of rotation of the control shaft initiated by the operation of the solenoid 60 is completed by virtue of the one revolution clutch mechanism which remains mechanically engaged until the completion of a single cycle of rotation. Thus, by the manual depression or operation of one of the keys 274 in the keyboard 20, the selected digit is recorded on the record stock 16.

In a similar manner, additional digits are recorded on the tag under the control of the manual keyboard 20 and, in response to each operation of one of the keys 274, the clutch 60 is momentarily operated to engage the one revolution clutch for a single cycle of rotation during which the selected digit is recorded, the commutator 62 is advanced a single step, and the stock 16 is advanced a single step.

In order to terminate manual operation of the tag making apparatus 10 and to return it to automatic operation, the release key 276 is operated to open the contacts 276a. The opening of these contacts interrupts the holding circuit for the stop relay 220 so that it releases to open the contacts 220b and to close the contacts 220a. The opening of the contacts 220b interrupts an additional point in the holding circuit for the relay 220 so that, when the release key 276 is released to close the contacts 276a, the stop relay 220 is not again operated. The closure of the contacts 220a completes the above described operating circuit for the relay 216 so that this relay operates to close the contacts 216a. The closure of these latter contacts again operates the clutch solenoid 60 so that the control shaft is continuously driven through the one revolution clutch by the motor 246. During this continuing rotation, additional fixed items of information are recorded on the tag in accordance with the strapping between the receptacle fields 266 and 268 under the control of the commutator 62, and the record stock 16 is advanced step-by-step incident to each recording operation. In the event that additional items of variable information are to be recorded on the tag, different ones of the receptacles 263 and 265 in the field 270 are strapped together and to the stop conductor 272 so that the automatic recording of information on the tag can be interrupted at any desired point.

To provide an indication of the number of tags produced by the machine 10, a serial numbering or counting device controlled by the solenoid 250 is provided. In order to selectively operate the solenoid 250, a relay 226 is provided which is strapped to one of the receptacles or jacks 260 in the field 266. Assuming that the numbering device is to be actuated when the commutator 62 is advanced to its twenty-first stepping position during each cycle of operation thereof, the operating winding of the relay 226 is strapped to the twenty-first receptacle 260 in the field 266. Accordingly, when the wiper 254 moves to the twenty-first stepping position and the cam 64 closes the contacts 64b, an obvious operating circuit is completed for the relay 226 so that this relay operates to close a pair of contacts 226a. The closure of the contacts 226a completes a circuit including the closed contacts 214b and 212c for energizing the solenoid 250. The operation of the solenoid 250 actuates the numbering device so that an indication is produced that an additional tag has been fabricated by the apparatus 10. The relay 226 and the components controlled thereby are released when the contacts 64b are next opened.

When all of the items of information on the tag have been recorded thereon by the apparatus 10, the wiper 254 moves into engagement with the contact 256 forming the last stepping position of the commutator 62. When the cam 64 next closes the contacts 64b, the end-of-tag relay 218 is again operated to close the contacts 218b and to open the contacts 218a and 218c. The opening of the contacts 218a and 218c produce no useful function. However, the closure of the contacts 218b again energizes the tag cutting solenoid 258 so that the scoring dies are moved into engagement with the blank stock 16 immediately adjacent the end of the recorded information thereon, thereby to complete the formation of a separable tag. When the contacts 64b are next opened, the relay 218 and the components controlled thereby are released. The commutator 62 is then advanced to its first stepping position and the above identified operations take place in the manner described above during which a second tag is produced including the fixed items of information and also the variable items of information which are entered under the control of the keyboard 20.

In the event that it is desirable to operate the tag making apparatus 10 so that only variable items of information are recorded thereon, the automatic cycle control switch 228 is provided. When the switch 228 is in the position illustrated in FIG. 2, the apparatus 10 is conditioned for automatic operation. However, when the switch 228 is thrown to its alternative position, the contacts 228a, 228c are opened and a pair of contacts 228b are closed. The opening of the contacts 228c normally prevents the operation of the relay 216 under the control of the contacts 214b, although the closure of the contacts 212e when the relay 212 is operated on the initial cycle of operation permits the relay 216 to be operated under the control of the contacts 214b for one cycle of rotation of the commutator 62 during which the leading end of the stock 16 is advanced into the unit 10. The opening of the contacts 228a prevents the operation of the stop relay 220 under the control of the commutator 62. The closure of the contacts 228b completes a shunt around the contacts 220b on the stop relay 220 and forwards the positive potential provided at the closed contacts 214b directly to the keys 274 forming the keyboard 20.

In addition, the positive potential provided at the closed contacts 228b completes an operating circuit extending through the closed contacts 276a on the release key 276 for operating the stop relay 220. The operation of the stop relay 220 opens the contacts 220a and closes the contacts 220b. However, these contact operations perform no useful function at this time. Accordingly, the relay 216 is not normally energized and thus the clutch solenoid 60 is normally released. When digits are to be recorded on the tag, the keys 274 are selectively operated so that the relays 222 and 224 operate and release sequentially, as described above, thereby completing momentary operating circuits for the relay 216 and the solenoid 60. This momentary operation of the solenoid 60 permits the control shaft to advance through a single cycle of revolution as described above in detail in conjunction with the manual entry of variable items of information during automatic operation of the tag forming machine 10. In this manner, the apparatus 10 can be converted from automatic operation to manual operation merely by changing the position of the automatic cycle key 228. The apparatus 10 is restored to a condition for automatic operation by returning the switch 228 to the position illustrated in FIG. 2.

After the control circuit illustrated in FIG. 2 has been placed in operation and the switch 228 is in position for automatic operation thereof, the apparatus 10 continuously operates to produce tags until such time as the start switch 206 is manually released or until such time as the switch 202 is released due to an absence of stock 16. When the switch 202 is opened, the relays 204 and 214, among others, remain operated until the end of the cycle of recording operation. At this time, the relay 218 operates to open the contacts 218b, thereby releasing the relay 204 and 214 to direct further operation of the unit 10.

If desired, the unit 10 can include an inked printing roll having an etched or similarly formed pattern thereon which is disposed adjacent the path of movement of the stock 16 through the unit 10. This roll, which is shifted into engagement with the stock 16 following its insertion into the unit 10, prints lines on the stock 16 to divide each tag into different fields or sectors and can also print certain items, such as the name of the store, on each of the tags.

In summary, the automatic tag making machine or apparatus 10 of the present invention provides means for automatically and repeatedly entering fixed and variable items of information on a blank record stock to provide tags bearing punched and visible indicia representing these items of information. These tags are produced step-by-step under the control of the commutator 62 which, in response to the completion of each cycle of operation, actuates the solenoid 258 so that successive record bearing portions of the stock 16 are scored to permit their separation into individual tags. These tags then provided with suitable means for affixing them to articles.

Although the present invention has been described in conjunction with a single embodiment thereof, it is obvious that numerous other embodiments may be devised by thoe skilled in the art which will fall within the spirit and scope of the principles of this invention.

What is claimed and desired to be secured by Letters Patent of the United States is:

1. An apparatus for making separable, indicia bearing tags from blank stock advanced by stock feeding means, comprising indicia recording means, means for storing data to be recorded on said tags, switching means continuously operable through successive cycles of operation in each of which cycles said switching means operates said recording means under the control of the stored data to record the stored data on said stock, control means for rendering said stock feeding means effective to advance said stock relative to said recording means in synchronism with the operation of said switching means, scoring means for scoring said stock to form the stock into data bearing tags, control means for controlling said scoring means, and means controlled by said switching means for operating said last-mentioned control means at the end of each of said successive cycles of operation so that said blank stock is scored to form a plurality of separable tags each having recorded indicia thereon representing the stored data.

2. The apparatus set forth in claim 1 including a keyboard connected to said indicia recording means, and means for selectively arresting cyclic operation of said switching means during each cycle thereof to render said recording means responsive to control by said keyboard, thereby to provide separable tags including both said stored data and variable data provided from said keyboard.

3. The apparatus set forth in claim 1 in which said recording means comprises perforating means and printing means concurrently operated by said stored data under the control of said switching means to provide both visible and sensible indicia on each of said separable tags.

4. An apparatus for automatically making separable data bearing tags from a roll of blank stock from which stock is advanced by a stock feeding means, comprising recording means, data storing means for storing the data to be automatically recorded on each of a plurality of successive tags by said recording means, switching means interconnecting said recording means and said data storing means, means cyclically operating the switching means under the control of the stored data for cyclically transferring said stored data to said recording means to record said data on spaced portions of said blank stock, control means for rendering said stock feeding means operable in synchronism with said cyclic operation of said switching means to move said stock relative to said recording means, and die controlling means controlled by said switching means for selectively operating a die to at least partially sever said stock, thereby to form tags from said stock each bearing the recorded data.

5. An apparatus for automatically making separable data bearing tags from a roll of stock from which blank stock is advanced by a stock feeding means, comprising recording means, data storing means for storing the data to be automatically recorded on each of a plurality of successive tags by said recording means, a commutator for interconnecting said recording means and said data storing means to transfer said stored data to said recording means for recording on spaced portions of said stock, means for continuously operating said commutator through a plurality of successive cycles in each of which the stored data is transferred to the recording means, control means for operating said stock feeding means in synchronism with cyclic operation of said commutator to move said stock relative to said recording means, and means controlled by said commutator for scoring said stock at the completion of each of said successive cycles of operation of said commutator, thereby to form the stock into distinct data bearing tags.

6. The apparatus set forth in claim 5 including means operated by the exhaustion of the supply of said stock for terminating continuous operation of said commutator.

References Cited in the file of this patent

UNITED STATES PATENTS

| | | |
|---|---|---|
| 2,076,705 | Carroll | Apr. 13, 1937 |
| 2,392,082 | Curtis | Jan. 1, 1946 |
| 2,405,246 | Watson | Aug. 6, 1946 |
| 2,708,873 | Braun | May 24, 1955 |
| 2,890,650 | Bone | June 16, 1959 |